(12) United States Patent
Weeks et al.

(10) Patent No.: US 8,226,343 B2
(45) Date of Patent: Jul. 24, 2012

(54) APPARATUS AND METHODS FOR LOADING AND TRANSPORTING CONTAINERS

(75) Inventors: Brian Weeks, Grande Prairie (CA); Darius Lyons, Grande Prairie (CA)

(73) Assignee: Brian Weeks, Grande Prairie, CA (US)

( * ) Notice: Subject to any disclaimer, the term of this patent is extended or adjusted under 35 U.S.C. 154(b) by 356 days.

(21) Appl. No.: 12/263,103

(22) Filed: Oct. 31, 2008

(65) Prior Publication Data
US 2010/0111655 A1    May 6, 2010

(51) Int. Cl.
*B60P 1/00*    (2006.01)
(52) U.S. Cl. .................................. 414/546; 414/498
(58) Field of Classification Search .............. 414/471, 414/495, 498, 546, 403, 408, 667, 619, 620, 414/639, 642, 664, 668, 685, 758, 671, 447, 414/444
See application file for complete search history.

(56) References Cited

U.S. PATENT DOCUMENTS

| | | | |
|---|---|---|---|
| 2,828,878 A * | 4/1958 | Letourneau | 414/546 |
| 2,867,341 A * | 1/1959 | Tieslau | 414/633 |
| 2,875,912 A * | 3/1959 | Thresher et al. | 414/622 |
| 3,052,323 A * | 9/1962 | Hopfeld | 187/232 |
| 3,187,917 A * | 6/1965 | Miller | 414/664 |
| 3,202,305 A * | 8/1965 | Herpich | 414/408 |
| 3,217,912 A | 11/1965 | McKeon | |
| 3,235,108 A * | 2/1966 | Drakulich | 414/622 |
| 3,438,525 A * | 4/1969 | Nutter | 414/620 |
| 3,521,780 A | 7/1970 | Cook | |
| 3,567,053 A * | 3/1971 | Willock | 414/620 |
| 3,659,732 A * | 5/1972 | Downey | 414/608 |
| 3,670,903 A * | 6/1972 | Hamilton | 414/772 |
| 3,773,202 A * | 11/1973 | Dutra, Jr. | 414/622 |
| 3,949,890 A | 4/1976 | Keller | |
| 4,013,185 A * | 3/1977 | Bratton | 414/608 |
| 4,219,300 A * | 8/1980 | McMillan | 414/420 |
| 4,278,390 A | 7/1981 | Ahearn | |
| 4,325,666 A | 4/1982 | Chain et al. | |
| 4,540,330 A | 9/1985 | Taylor | |
| 4,549,845 A * | 10/1985 | Ramsey, Jr. | 414/620 |
| 4,600,350 A | 7/1986 | Matthewson et al. | |
| 4,722,658 A * | 2/1988 | Wurtz et al. | 414/408 |

(Continued)

FOREIGN PATENT DOCUMENTS

CA    2152496 A1    5/1995

(Continued)

*Primary Examiner* — Saul Rodriguez
*Assistant Examiner* — Glenn Myers
(74) *Attorney, Agent, or Firm* — Oyen Wiggs Green & Mutala LLP

(57) ABSTRACT

Apparatus and methods for loading, transporting and dumping a plurality of containers on a vehicle are provided. The apparatus includes a frame pivotally attachable a vehicle bed, an upper container engaging means and a lower container engaging means, both coupled to the frame. The upper container engaging means is moveable between a first height and a second height, the first height and the second height differing by greater than at least the height of a container. The lower container engaging means may be stowed and deployed. The upper container engaging means is moveable to the first height for loading a first container when the lower container engaging means is stowed. The lower container engaging means is deployed at the first height for loading the second container when the upper container engaging means is at the second height. The first container and second container may thereby be sequentially loaded and simultaneously transported on the vehicle.

16 Claims, 5 Drawing Sheets

U.S. PATENT DOCUMENTS

| | | | |
|---|---|---|---|
| 4,778,327 A | 10/1988 | Tufenkian et al. | |
| 4,943,203 A | 7/1990 | Bohata | |
| 5,215,427 A * | 6/1993 | Olsthoorn et al. | 414/664 |
| 5,391,043 A | 2/1995 | Bohata et al. | |
| 5,427,495 A * | 6/1995 | Vlaanderen | 414/498 |
| 5,466,110 A * | 11/1995 | Redding | 414/421 |
| 5,816,764 A | 10/1998 | Bohata | |
| 5,989,346 A * | 11/1999 | Hiroki | 118/719 |
| 6,068,086 A | 5/2000 | Bushong et al. | |
| 6,457,727 B1 * | 10/2002 | Tolly | 280/47.28 |
| 6,557,869 B2 * | 5/2003 | Gillette et al. | 280/47.28 |
| 6,705,823 B2 | 3/2004 | Bohata | |
| 6,725,565 B2 * | 4/2004 | Harano et al. | 34/266 |
| 6,764,274 B2 * | 7/2004 | Maclay | 414/812 |
| 2006/0086264 A1 * | 4/2006 | Brees | 100/214 |
| 2006/0204351 A1 * | 9/2006 | O'Neil | 414/405 |
| 2006/0263182 A1 | 11/2006 | Mizner | |
| 2007/0166141 A1 * | 7/2007 | McGrane et al. | 414/558 |

FOREIGN PATENT DOCUMENTS

| | | |
|---|---|---|
| DE | 19543264 | 5/1997 |
| GB | 1203574 | 8/1970 |
| GB | 2115378 | 9/1983 |
| WO | 2006/135137 | 12/2006 |

* cited by examiner

APPARATUS AND METHODS FOR LOADING AND TRANSPORTING CONTAINERS

TECHNICAL FIELD

This invention relates generally to apparatus and methods for loading and transporting containers. More particularly, this invention relates to vehicle-mounted apparatus and methods for loading and transporting more than one container at a time.

BACKGROUND

Vehicles mounted with lifting apparatus for carrying a single container are known in the prior art. For example U.S. Pat. No. 5,816,764 to Bohata discloses a truck for lifting and transporting containers, wherein the bed of the truck may be pivoted between horizontal and vertical positions and a set of forks attached to the bed may engage a single container. One drawback of such prior art is that the apparatus are limited to carrying one load at a time. Another drawback of such apparatus is that they rely upon relatively expensive and heavy-duty mechanical parts, which are not suitable or cost effective for many applications.

There is a need for apparatus for loading and transporting containers that are capable of carrying more than one container at a time. As well, there is a need for apparatus that are adapted to be mounted on vehicles of relatively smaller size and weight so as to be more versatile and cost effective.

SUMMARY

One aspect of this invention provides an apparatus for loading and transporting a plurality of containers on a vehicle having a bed. The apparatus includes a frame pivotally attachable to the bed of the vehicle and pivotable between a generally vertical loading position and a tilted resting position over the bed. The apparatus also includes an upper container engaging means for loading a first container. The upper container engaging means is coupled to the frame and moveable between positions including a first height and a second height along the frame. The first height and the second height differ by greater than at least a height of one of the plurality of containers. The apparatus also includes a lower container engaging means for loading a second container. The lower container engaging means is coupled to the frame and configurable between a stowed configuration and a deployed configuration. The upper container engaging means is moveable to the first height for loading the first container when the lower container engaging means is in the stowed configuration. The lower container engaging means is configurable to the deployed configuration at the first height for loading the second container when the upper container engaging means is at the second height. The first container and second container may thereby be sequentially loaded and simultaneously transported on the vehicle.

Another aspect provides an apparatus for loading and transporting a plurality of containers on a vehicle. The apparatus includes a bed and a frame. The frame is pivotally attached to the bed of the vehicle and pivotable between a generally vertical loading position and a tilted resting position over the bed. The apparatus also includes an upper container engaging means for loading a first container. The upper container engaging means is coupled to the frame and moveable between positions including a first height and a second height along the frame. The first height and the second height differ by greater than at least a height of one of the plurality of containers. The apparatus also includes a lower container engaging means for loading a second container. The lower container engaging means is coupled to the frame and configurable between a stowed configuration and a deployed configuration. The upper container engaging means is moveable to the first height for loading the first container when the lower container engaging means is in the stowed configuration. The lower container engaging means is configurable to the deployed configuration at the first height for loading the second container when the upper container engaging means is at the second height. The first container and second container may thereby be sequentially loaded and simultaneously transported on the vehicle.

A further aspect provides a vehicle for loading and transporting a plurality of containers. The vehicle include a cab and a bed extending rearward from the cab. The vehicle also includes a frame pivotally attached to the bed of the vehicle and pivotable between a generally vertical loading position and a tilted resting position over the bed. The apparatus also includes an upper container engaging means for loading a first container. The upper container engaging means is coupled to the frame and moveable between positions including a first height and a second height along the frame. The first height and the second height differ by greater than at least a height of one of the plurality of containers. The apparatus also includes a lower container engaging means for loading a second container. The lower container engaging means is coupled to the frame and configurable between a stowed configuration and a deployed configuration. The upper container engaging means is moveable to the first height for loading the first container when the lower container engaging means is in the stowed configuration. The lower container engaging means is configurable to the deployed configuration at the first height for loading the second container when the upper container engaging means is at the second height. The first container and second container may thereby be sequentially loaded and simultaneously transported on the vehicle.

Another aspect provides an apparatus for loading and transporting a plurality of waste bins having side-mounted sleeves on a truck having a bed. The apparatus includes a forklift pivotally attachable to the rear of the bed of the truck. The forklift is pivotable between a generally vertical loading position and a tilted resting position over the bed. The apparatus also includes an upper set of forks for loading a first waste bin. The upper set of forks slidably is coupled to the forklift and moveable between a first height and a second height along the forklift. The first height and the second height differ by at least a height of one of the plurality of waste bins. The apparatus also includes a lower set of forks for loading a second waste bin. The lower set of forks is slidably coupled to the forklift. The upper set of forks is moveable to the first height for loading the first waste bin when the lower set of forks is not at the first height. The lower set of forks is moveable to the first height for loading the second waste bin when the lower set of forks is at the second height. The first waste bin and second waste bin may thereby be sequentially loaded and simultaneously transported on the truck.

A further aspect provides a method for loading a plurality of containers on a vehicle for transport. The method comprising the steps of:
 (a) pivoting a frame to a generally vertical loading position;
 (b) configuring a lower container engaging means in a stowed position;
 (c) positioning an upper container engaging means at a first height for loading a first container;
 (d) engaging the first container with the upper container engaging means;

(e) raising the upper container engaging means with the first container engaged thereto to a second height, wherein the first height and the second height differs by greater than at least a height of one of the plurality of containers;

(f) configuring the lower container engaging means to a deployed position (g) positioning the lower container engaging means at the first height for loading a second container;

(h) engaging the second container with the lower container engaging means; and (i) pivoting the frame to a tilted resting position.

Another aspect provides a method for dumping contents of a plurality of containers from a vehicle. The method comprising the steps of:

(a) pivoting a frame to a generally vertical loading position;

(b) lowering a second container to the ground and disengaging a lower container engaging means from the second container;

(c) configuring the lower container engaging means in a stowed position;

(d) rotating an upper container engaging means to dump the contents of a first container and rotating the first container back upright;

(e) lowering the first container to the ground and disengaging the upper container engaging means from the first container;

(f) engaging the second container with the upper container engaging means; and (g) rotating the upper container engaging means to dump the contents of the second container and rotating the second container back upright.

Further aspects and embodiments will become apparent by reference to the drawings and the following detailed description.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of this invention provide apparatus for loading, transporting, dumping and unloading containers. The term "containers" as used in this specification includes waste bins (also known as dumpsters), recycling bins, transport bins, storage bins and the like. Other aspects of this invention provide vehicles, such as pick-up trucks, that are fitted with such apparatus. Other aspects of this invention provide methods for loading, unloading, transporting and dumping containers using such apparatus.

Figure 1:
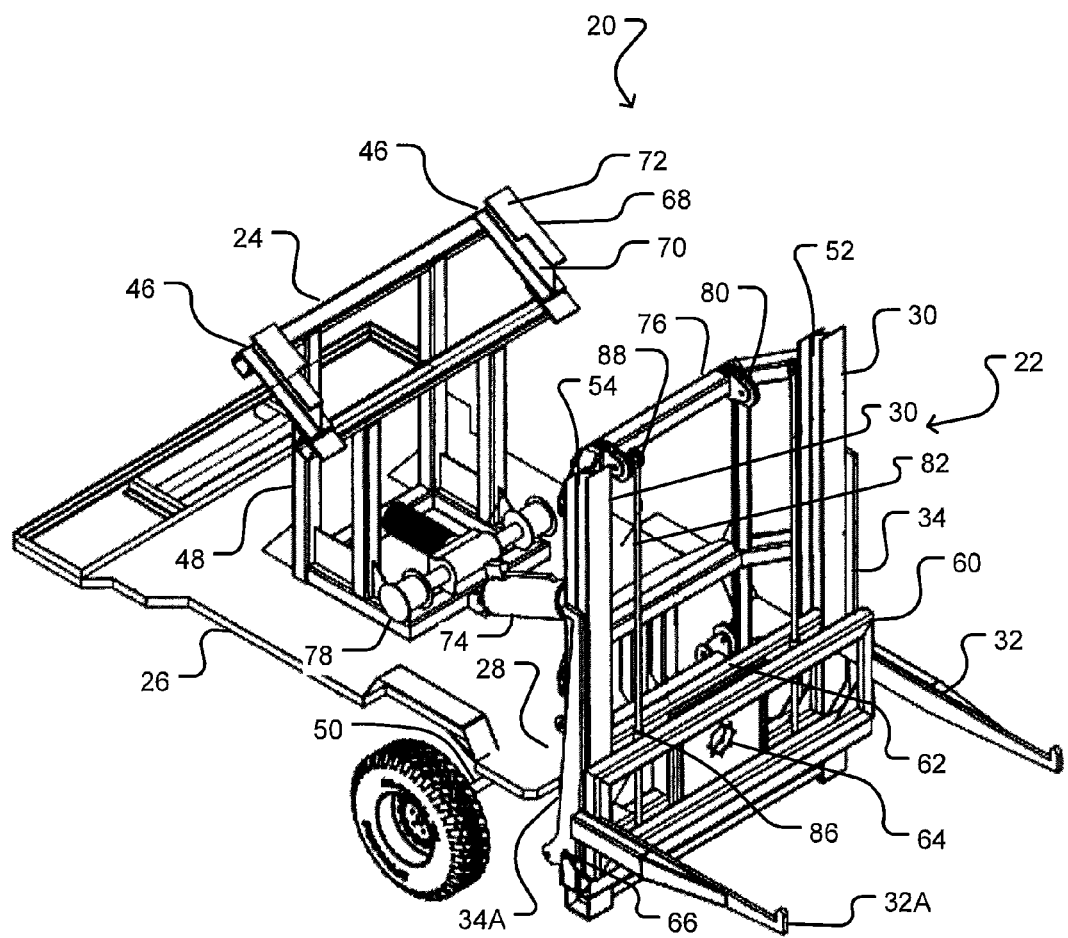
FIG. 1 is an isometric view of an apparatus for loading and transporting containers according to an example embodiment of the present invention, showing a lower set of forks in a stowed position.
Figure 2A:
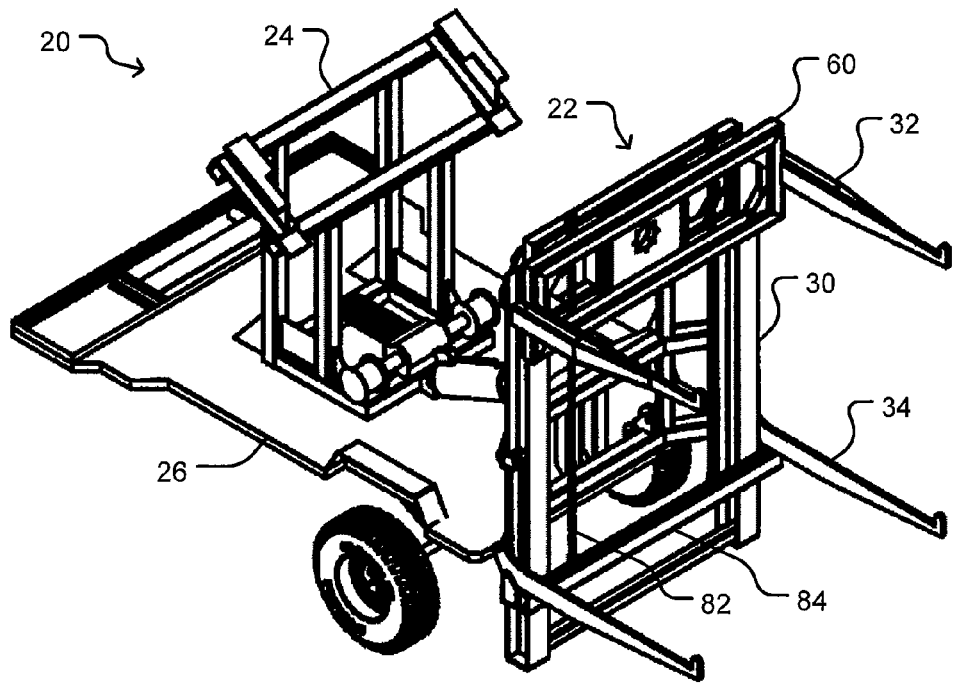
FIG. 2A is an isometric view of the apparatus shown in FIG. 1, showing a lower set of forks in a deployed position.

FIG. 1 illustrates an apparatus 20 for loading and transporting containers according to a particular embodiment of the present invention. Apparatus 20 includes a forklift 22 for engaging and lifting containers, a support stand 24 for securing and supporting forklift 22 during transport, and a deck 26 on which forklift 22 and support stand 24 are attached. Forklift 22 is pivotally attached to a rear portion 28 of deck 26, allowing it to pivot between a tilted resting position (as shown for example in FIGS. 2B and 3C) and an upright loading/unloading position (as shown for example in FIG. 1). An upper forks 32 extend perpendicularly outward from vertical columns 30. Upper forks 32 may be raised or lowered along columns 30. Lower forks 34 are also disposed along columns 30. Lower forks 34 are pivotable between a stowed position aligned with columns 30 (as shown in FIG. 1) and a deployed position extending perpendicularly rearward from columns 30 (as shown in FIG. 2A). When deployed, lower forks 34 may be raised or lowered along columns 30.

Figure 2B:
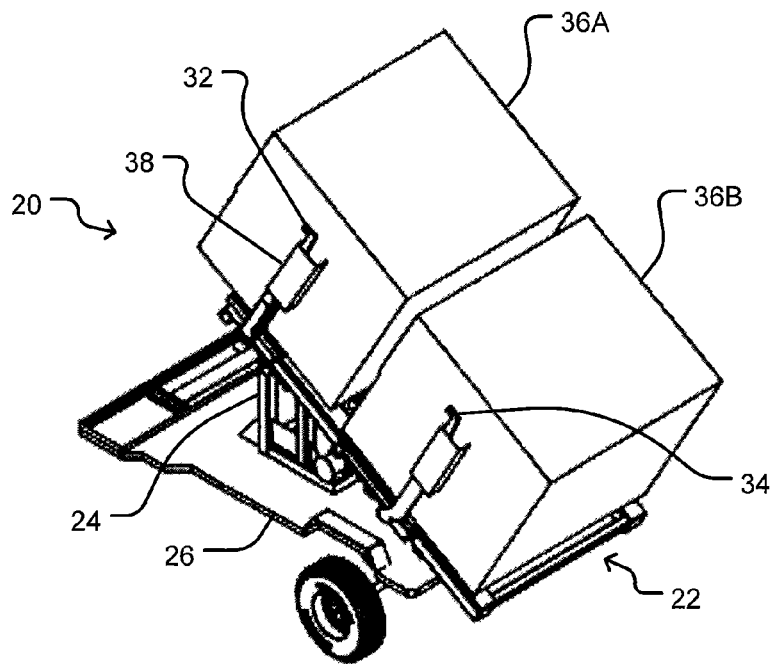
FIG. 2B is an isometric view of the apparatus shown in FIG. 1, showing two containers loaded.

Both upper and lower forks 32, 34 are configured to engage a container 36. FIG. 2B depicts apparatus 20 in its tilted resting position carrying two containers 36 (a first container 36A and a second container 36B). Upper forks 32 and lower forks 34 are each configured such that they may engage a container 36 by its side sleeves 38. Methods for loading two containers as illustrated are described in more detail below.

Apparatus 20 is adapted to be attached to a bed 42 of a vehicle 40 (as best illustrated in FIGS. 3A-3C and 4), allowing vehicle 40 to load, transport, and unload containers 36. Bed 42 includes any structure that extends rearward of a cab 41 of vehicle 40 over the rear axle(s) of vehicle 40 capable of supporting apparatus 20. In the illustrated embodiments, apparatus 20 is attached to vehicle 40 such that forklift 22 pivots off the back end of bed 42 and upper forks 32 and lower forks 34 (when deployed) extend in the rearward direction. Apparatus 20 may be attached, for example, by bolting deck 26 to bed 42 such that rear end 28 aligns approximately with the rear end of bed 42.

When forklift 22 is in its upright loading position with lower forks 34 in their stowed position as shown in FIG. 1, forklift 22 may be operated in a manner similar to a typical single-load forklift. That is, rearwardly extending upper forks 32 may be raised and lowered along the length of columns 30, may engage a container 36 as vehicle 40 backs up, and may lift and transport engaged container 36 as desired.

FIG. 2A illustrates apparatus 20 with forklift 22 is in its upright loading position and lower forks 34 in their deployed position. In their deployed position, lower forks 34 extend rearwardly, parallel to upper forks 32, such that they may be used to engage a container 36. If upper forks 32 are engaging a first container 36A, then lower forks 34 may be used to engage a second container 36B (assuming first container 36A is raised high enough to clear second container 36B as it is engaged). In particular embodiments, lower forks 34 are only deployable when upper forks 32 are raised to a height which would allow lower forks 34 to safely engage a second container 36B. This height would generally correspond to a height at least as great as the height of an individual container 36. In such embodiments, once lower forks 34 are deployed, upper forks 32 and lower forks 34 may be raised and lowered in conjunction so as to maintain a fixed distance between them.

Forklift 22 may pivot between its upright position and a tilted resting position wherein columns 30 rest on support stand 24. Support stand 24 is fixedly attached to deck 26 in a position so as to receive columns 30 as they pivot downwards. Support stand 24 has receiving ledges 46 held aloft by suitable means, such as by posts 48. Receiving ledges 46 are aligned such that columns 30 lie flush against them when forklift 22 is in its tilted resting position. In other words, ledges 46 form an acute angle relative to deck 26 equal to the acute angle formed by columns 30 relative to deck 26 when they are in the tilted resting position. By way of non-limiting example, in particular embodiments (such as those illustrated) this angle may be between 20 and 40 degrees, and preferably approximately 30 degrees.

Forklift 22 is preferably maintained in the tilted resting position against support stand 24 while vehicle 40 is in transit. When in this tilted resting position, support stand 24 supports a portion of the weight of forklift 22 and its load. Upper forks 32 and lower forks 34 (if deployed), along with container(s) engaged thereto, may be raised and lowered along columns 30 when in the tilted resting position to advantageously distribute the weight of container(s) over bed 42 of vehicle 40. For example, the weight may be centered over a rear axle 50 of vehicle 40.

Ledges 46 of support stand 24 may also be configured to allow columns 30 to slide into a locked position while forklift 22 is in the tilted resting position (as described further below). When in this locked position, forklift 22 is secured in place against ledges 46, preventing forklift 22 (and any load engaged thereto) from shifting or bouncing significantly during transport. Support stand 24 may also serve to ensure columns 30 do not impact cab 41 of vehicle 40 as they pivot downwards.

Maintaining forklift 22 in a tilted resting position against support stand 24 during transport (rather than in a fully horizontal position) also ensures that loaded containers 36 remain partially upright, thus reducing the possibility that the contents of containers 36 may spill. This is a simpler and less expensive approach to transporting containers 36 compared to prior art apparatus that required an additional mechanism for pivoting the forks to maintain the containers upright as the forklift was laid flat on the bed. The tilted resting position also permits forklift 22 to extend above cab 41 of vehicle 40, allowing for distribution of the weight of the load more forwardly, a feature which may be beneficial in certain situations for example with front-wheel drive vehicles. Extending forklift 22 over cab 41 of vehicle 40 also provides the possibility of carrying a greater number of loads than would be possible if forklift 22 were limited to resting in the horizontal position since in the horizontal position the extent of forklift 22 would be limited by the length of bed 42.

Figure 3A:
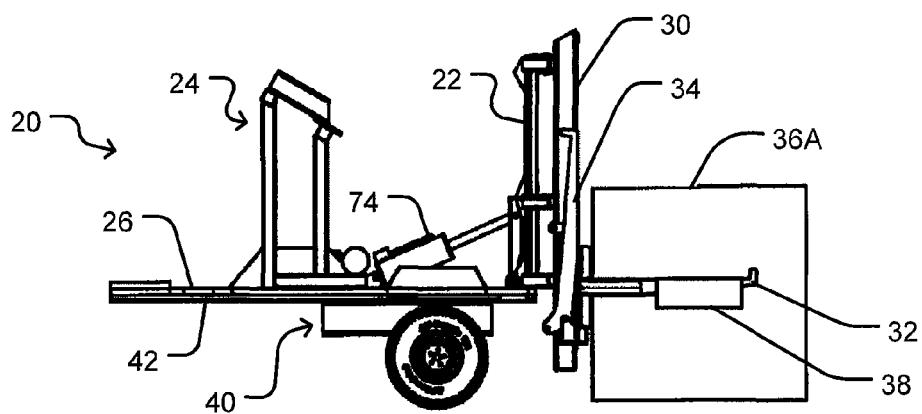
FIG. 3A is a side elevation view of the apparatus shown in FIG. 1 showing a first container loaded.
Figure 3B:
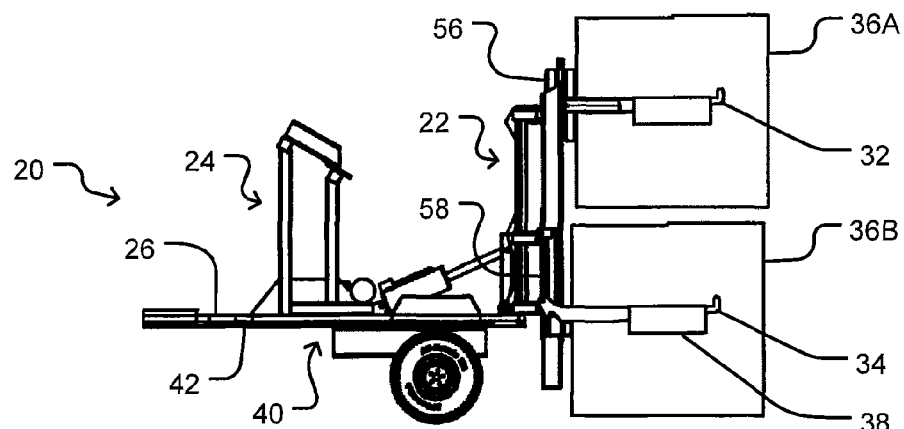
FIG. 3B is a side elevation view of the apparatus shown in FIG. 1 showing a second container loaded.

In the embodiment shown in FIG. 1, columns 30 are I-beams having inner tracks 52 that face inward toward each other and outer tracks 54 that face outward away from each other. Inner roller boxes 56, disposed in inner tracks 52, move upper forks 32 up and down along columns 30. Outer roller boxes 58, disposed in outer tracks 54, move lower forks 34 up and down along columns 30 (when lower forks 34 are deployed). Inner and outer roller boxes 56, 58 are best shown in FIG. 3B.

In the embodiment shown in FIG. 1, upper forks 32 are affixed to a rotatable plate 60. Rotatable plate 60 may be rotated clockwise or counterclockwise about a common axis centered between upper forks 32 and orthogonal to rotatable plate 60. When upper forks 32 are engaging a container 36, the rotation of rotatable plate 60 allows container 36 to be turned upside down and its contents to be dumped. In particular embodiments, rotatable plate 60 may only be rotatable when lower forks 34 are in their stowed position.

In the embodiment shown in FIG. 1, rotatable plate 60 is attached to a base plate 62 by a rotation mechanism 64. Base plate 62 is slidably coupled to inner tracks 52 of columns 30 by inner roller boxes 56. Rotation mechanism 64 may be any suitable mechanism for rotating rotatable plate 60, such as for example a hydraulic rotator.

Upper forks 32 may be raised and lowered by any suitable mechanical means. For example, in particular embodiments, upper forks 32 are raised and lowered by means of a hydraulic winch 78 attached to deck 26. Rotation of winch 78 serves to pull or release winch lines (not shown) that are connected over pulleys 80 to base plate 62, which in turn causes upper forks 32 to be raised and lowered along columns 30. In other embodiments, upper forks 32 may be raised and lowered by other means, such as by a hydraulic cylinder.

In the illustrated embodiments, lower forks 34 are pivotally attached by hinges 66 to outer roller boxes 58, which are slidably attached to outer tracks 54 of columns 30. Hinges 66 allow lower forks 34 to pivot from their stowed position (aligned with columns 30) to their deployed position (perpendicularly outward from columns 30). Lower forks 34 may be pivoted by any suitable mechanical means, such as for example by a hydraulic cylinder.

Lower forks 34 may be raised and lowered by any suitable mechanical means. In the illustrated embodiment, lower forks 34 are raised and lowered by means of rods 82, which cause lower forks 34 to move in conjunction with upper forks 32 when upper forks 32 are above a threshold height. Rods 82 are attached at their lower end to a cross beam 84 of lower forks 34 and terminate at their upper end in stoppers 88. Rods 82 extend upward from cross beam 84 through sleeves 86 attached to base plate 62 of upper forks 32. Stoppers 88 are sized such that they do not fit through sleeves 86. When upper forks 32 are raised to the threshold height above lower forks 34, sleeves 86 engage stoppers 88. When upper forks 32 are raised above this threshold height, they carry with them lower forks 34 (which are suspended by stoppers 88 of rods 82). The threshold height preferably corresponds to a separation between upper forks 32 and lower forks 34 that allows both forks to simultaneously be engaging a container 36. As mentioned above, lower forks 34 may be configured to only be deployable when upper forks 32 are raised to the threshold height. Furthermore, once lower forks 34 are deployed, upper forks 32 may be restricted from being lowered below the threshold height. In this manner, when lower forks 34 are deployed, rods 82 serve to maintain a fixed safe distance between deployed lower forks 34 and upper forks 32. In other embodiments, lower forks 34 may be raised and lowered by other means, such as by a separate hydraulic cylinder.

Forklift 22 may be pivoted between its upright loading position and its tilted resting position by any suitable mechanical means. For example, in the illustrated embodiments, forklift 22 is pivoted by a hydraulic ram 74. Hydraulic ram 74 is attached at one end to deck 26 and at its other end to a support frame 76 of forklift 22. Support frame 76 is pivotally attached along a lower edge to deck 26 and is fixedly attached to columns 30 in such a manner that it holds columns 30 over the back of deck 26 when forklift 22 is in its upright loading position.

Inner roller boxes 56 may be raised such that they extend above the top edge of columns 30. As illustrated in FIG. 1, support stand 24 may have locking structures 68 attached to receiving ledges 46. Locking structures 68 have an open lower region 70 configured to allow columns 30 to pivot unobstructed onto ledges 46 when inner roller boxes 56 are not extending above the top of edge of columns 30, and a closed upper region 72 configured to receive and hold in place inner roller boxes 56 when they are extended above the top of edge of columns 30 from the tilted resting position. Thus, to lock forklift 22 into its tilted resting position against support stand 24, columns 30 are first pivoted downward onto ledges 46 with inner roller boxes 56 retracted below the top of edge of columns 30, and then inner roller boxes 56 are extended above the top of edge of columns 30 such that they slide into the opening formed by closed upper region 72 of locking structures 68.

In the illustrated embodiments, columns 30 are of a fixed height. However, in alternative embodiments, columns 30 may have adjustable height such as by means of telescoping. By way of non-limiting example, apparatus 20 may be provided with two-stage, three-stage, or multi-stage telescoping columns extending to any desired height. In such embodiments, support stand 24 may serve to ensure columns 30 extend over the cab 41 of vehicle 40 when forklift 22 is in its tilted resting position (such that columns 30 may be extended to a height greater than the length of bed 42 of vehicle 40). Telescoping may also be beneficial when the contents of containers 36 are to be dumped into a receiving end with relatively high walls, such as a bucket of a dump truck.

Apparatus 20 according to a particular embodiment is adapted to carry containers 36 that are a standard six cubic yards in volume. Apparatus 20 according to other embodiments may be adapted to carry containers 36 of other shapes and sizes.

Aspects of this invention include vehicles 40 fitted with apparatus 20 as described above. Apparatus 20 according to various embodiments is adapted to be mounted on commercially available vehicles 40 of various types and sizes. By way of non-limiting example, vehicles 40 may be standard pick-up trucks without box or other standard flat-bed vehicles. Vehicles 40 may be of a relatively small size and low cost compared to other waste disposal vehicles known in the prior art.

Embodiments of apparatus 20 and vehicles 40 may incorporate means for a human operator to control forklift 22. For example, a control box (not shown) may be located in cab 41 of vehicle 40, on the bed 42 of vehicle 40, or may be portable. Such a control box may comprise suitable controls (such as joysticks, levers, buttons, etc.) to allow an operator to pivot forklift 22, raise and lower upper forks 32 and lower forks 34, pivot lower forks 34, and rotate upper forks 32. The control box may control the mechanical parts of forklift 22 by any suitable means, such as by an electrical-over-hydraulic system.

Figure 3C:
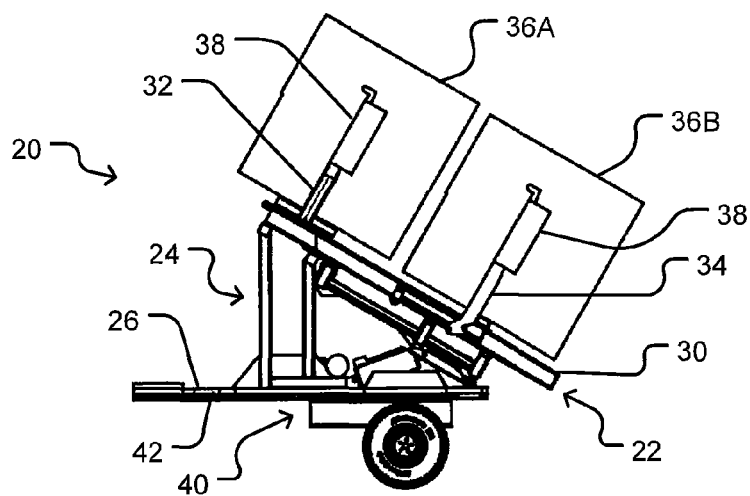
FIG. 3C is a side elevation view of the apparatus shown in FIG. 1 showing the apparatus in a tilted transportation position with two containers loaded.
Figure 4:
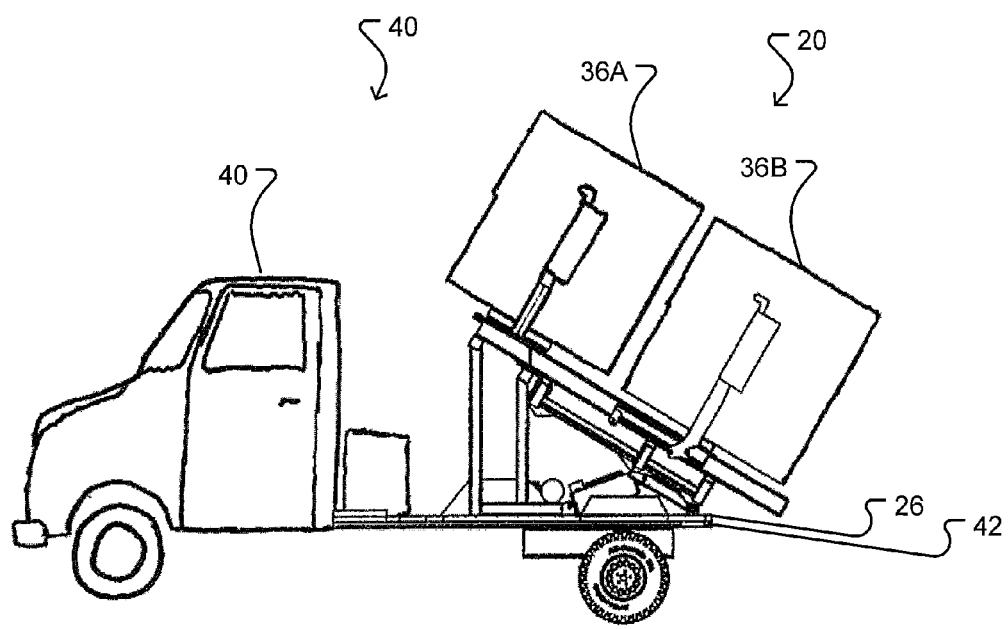
FIG. 4 is a side elevation view of the apparatus shown in FIG. 1 attached to a vehicle.
Figure 5:
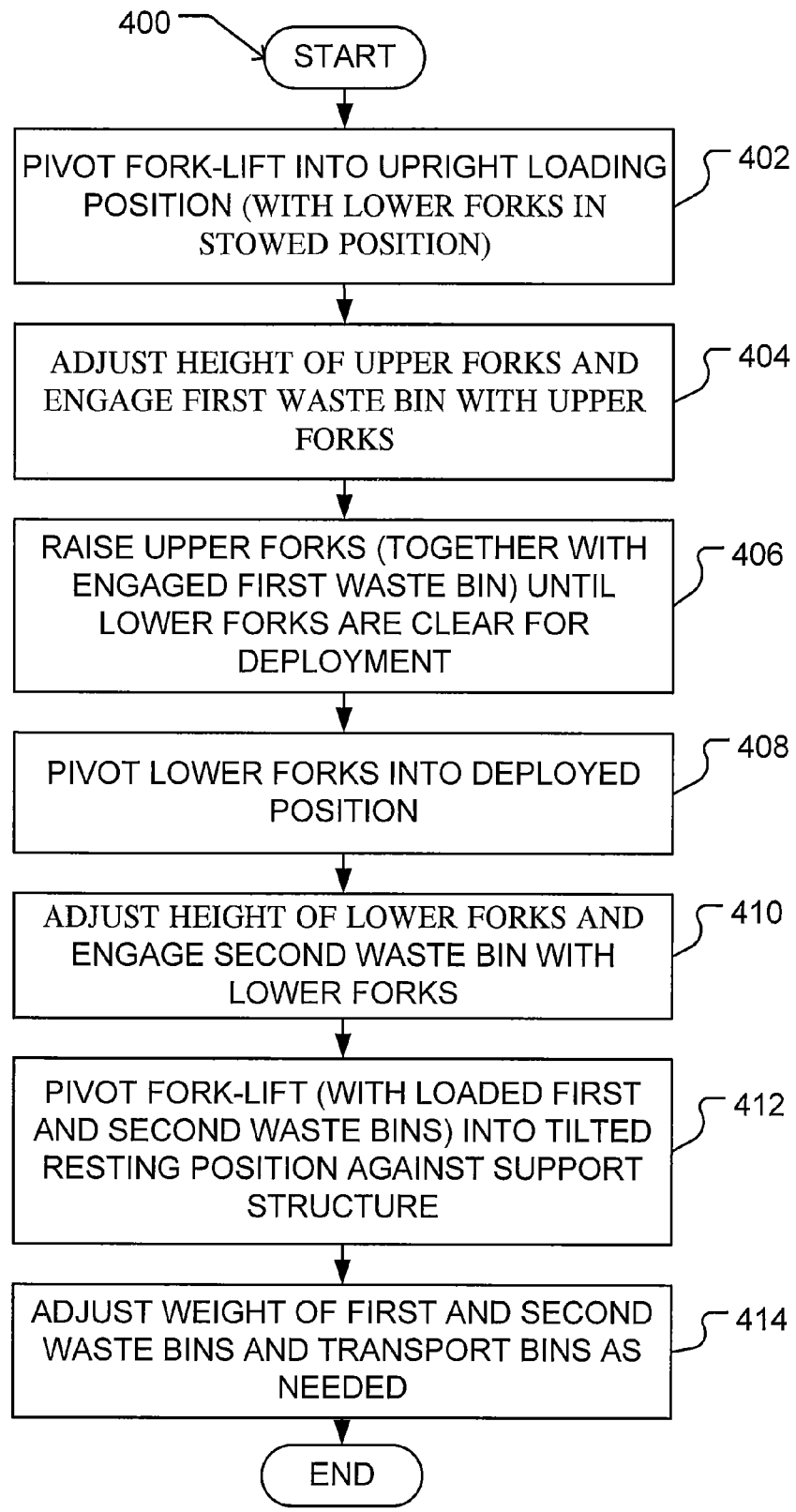
FIG. 5 is a flowchart illustrating the steps of a method of loading two containers according to a particular embodiment of the invention.

Aspects of this invention include methods for using apparatus 20 and vehicles 40. FIG. 4 illustrates the steps of a method 400 for loading two containers 36 using apparatus 20 (mounted on vehicle 40) according to a particular embodiment of this invention. FIGS. 3A to 3C illustrate the operation of apparatus 20 at three stages of this method as described next. At the start of method 400, it is assumed that forklift 22 is in its tilted resting position, that no containers 36 are loaded, and that lower forks 34 are in their stowed position. It is also assumed that vehicle 40 has moved into a position such that it may maneuver in reverse towards first and second containers 36A, 36B to be loaded.

Method 400 begins at block 402, which involves pivoting forklift 22 into its upright loading position such that upper forks 32 extend rearward, parallel to the ground, towards first container 36A. Method 400 then proceeds to block 404, which entails adjusting the height of upper forks 32 along columns 30 to align with side sleeves 38 of first container 36A and reversing vehicle 40 toward first container 36A such that upper forks 32 engage side sleeves 38 of first container 36A. FIG. 3A depicts apparatus 20 with first container 36A loaded after completing block 404 of method 400.

Method 400 then proceeds to block 406, which involves raising upper forks 32 (and first container 36A engaged thereto) along columns 30 to a height sufficient to permit lower forks 34 to be deployed and engage a second container 36B. At block 408, lower forks 34 are then moved from their stowed position (aligned with columns 30) to their deployed position (extending perpendicularly rearward from columns 30, parallel to the ground, towards second container 36B).

Method 400 then proceeds to block 410, which entails adjusting the height of lower forks 34 along columns 30 to align with side sleeves 38 of second container 36B and reversing vehicle 40 toward second container 36B such that lower forks 34 engage side sleeves 38 of second container 36B. FIG. 3B depicts apparatus 20 with first and second containers 36A, 36B loaded after completing block 410 of method 400.

Method 400 then proceeds to block 412, which involves pivoting forklift 22 back to its tilted resting position against support stand 24 (and optionally sliding it into its locked position). Finally, at block 414, upper and lower forks 32, 34 may be raised or lowered along columns 30 so as to advantageously distribute the weight of first and second containers 36A, 36B on vehicle 40. At the end of method 400, two containers are loaded on vehicle 40 and are ready to be transported as needed, as depicted in FIG. 3C.

Other embodiments of this invention include methods for unloading and dumping containers 36 from apparatus 20/vehicle 40. Such methods may be useful, for example, after loading two full containers (first container 36A and second container 36B) according to method 400. It may then be desired to transport containers 36 to a location where their contents may be dumped and then to return the empty containers 36 to the location where they were originally picked up.

An example method for dumping two containers 36 is as follows. This method assumes that apparatus 20 includes some means for rotating upper forks 32, such as by rotatable plate 60 described above. The first step of this method, once loaded vehicle 40 arrives at a location where the contents of containers 36 are to be dumped, is to pivot forklift 22 up to its upright loading/unloading position. The second container 36B is then unloaded by lowering lower forks 34 until second container 36B rests on the ground (or other landing surface) and driving vehicle 40 forward to disengage lower forks 34. The next step is to pivot lower forks 34 from their deployed position to their stowed position, such that the space under upper forks 32 is clear. Upper forks 32 may then be positioned over the desired dumping area and rotated so as to flip first container 36A upside-down and dump its contents out. Once its contents are dumped, upper forks 32 (and first container 36A engaged thereto) may be rotated back to their upright position. The next step is to unload empty first container 36A by lowering it to the ground (or other landing surface) and disengaging upper forks 32 (by driving vehicle 40 forward).

Upper forks 32 are then free to re-engage second container 36B, raise it as needed, and position it over the desired dumping area. Upper forks 32 may then be rotated so as to dump the contents of second container 36B and then be rotated back to their upright position. Finally, assuming it desired to transport both empty containers 36 back to some location, lower forks 34 may be pivoted to their deployed position and used to re-engage empty first container 36A. At this point in the method, forklift 26 is carrying two empty containers 36 and may pivoted to back its tilted resting position for further transport.

Apparatus 20 and vehicles 40 provide a number of improvements over the prior art. The ability to transport two loads simultaneously is advantageous because it reduces the number of trips required to transport multiple containers between locations, which in turn saves time and reduces expenses such as gas and vehicle wear and tear. In rural areas in particular, the distance between the location of containers and the location of a dump where the containers must occasionally be transported may be significant. In such a rural area, carrying two bins at once may halve the number of long trips required, thereby halving the significant time and expenses associated with such trips. Furthermore, apparatus 20 and vehicles 40, relative to large heavy waste disposal vehicles, are simple and cost effective to produce, thereby making them more affordable to a wide variety of potential users and more versatile for a wide variety of applications. For example, this invention may be well suited to smaller rural operators that may not need, and may not be able to afford, large heavy-duty waste disposal equipment.

Although example embodiments have been described above as being adapted to engage standard waste bins having side-sleeves, it should be understood that embodiments of apparatus 20 and vehicle 40 may be used to engage and transport other types of loads. For example, upper and lower forks 32, 34 may be configured to engage standard forklift pallets (on which any load may be affixed), or any other object capable of being engaged by forks. Furthermore, upper and lower forks 32, 34 are not limited to the particular design depicted in the Figures or to conventional "fork" shapes, but rather are intended to encompass any type of suitable attachment for engaging a load.

Embodiments of apparatus 20 and vehicle 40 may also have more than two sets of forks. Particular embodiments may have multiple sets of forks disposed along columns 30, thereby allowing multiple loads to be transported simultaneously. For example, a particular embodiment of apparatus 20 may comprise three set of forks wherein the lower two sets of forks are pivotable between a stowed position and a deployed position. In such an embodiment, the uppermost set of forks may engage a first load when the lower two sets of forks are stowed, the middle set of forks may then engage a second load while the lowermost set of forks is stowed and the uppermost set of forks is raised, and the lowermost set of forks may then engage a third load when the two upper sets of forks are raised.

To accommodate multiple sets of forks engaging multiple loads, apparatus 20 may, for example, employ multi-stage telescoping columns 30 that extend to a sufficient height. As mentioned above, in such embodiments support stand 24 may allow columns 30, and any loads engaged thereto, to extend over cab 41 of vehicle 40 when forklift 22 is in its tilted resting position.

While a number of exemplary aspects and embodiments have been discussed above, those of skill in the art will recognize certain modifications, permutations, additions and sub-combinations thereof. For example:

- the support stand may be attached to the forklift rather than the deck; the deck, in turn, may or may not have suitable means, such as grooves or stoppers, for receiving such a support stand;
- the lower forks that may be slidable, instead of stowable, to avoid obstructing engagement of upper forks with container when loading the first container; and
- the height of support stand and angle of ledge may be adjustable to provide adjustability of tilted resting position (e.g. some loads may be preferred to transport at a higher tilt to prevent spillage).

It is therefore intended that the following appended claims and claims hereafter introduced are interpreted to include all such modifications, permutations, additions and sub-combinations as are within their true spirit and scope.

What is claimed is:

1. An apparatus for loading and transporting a plurality of containers on a vehicle, the vehicle having a bed, the apparatus comprising:
    a frame pivotally attachable to the bed of the vehicle, the frame pivotable between a generally vertical loading position and a tilted resting position of between about 20 to 40 degrees over the bed;
    upper forks for loading a first container, the upper forks coupled to the frame and moveable between positions including a first height and a second height along the frame, the first height and the second height differing by greater than at least a height of one of the plurality of containers;
    lower forks for loading a second container, the lower forks coupled to the frame and configurable between a stowed configuration and a deployed configuration at the first height,
    wherein the upper forks are moveable to the first height for loading the first container when the lower forks are in the stowed configuration;
    wherein the lower forks are configurable to the deployed configuration at the first height for loading the second container when the upper forks loaded with the first container are at the second height;
    wherein the upper and lower forks load the first and second containers by slidingly engaging respective sleeves of the first and second containers;
    whereby the first container and second container may be sequentially loaded and simultaneously transported on the vehicle.

2. An apparatus according to claim 1 further comprising a support stand attachable to the bed, whereby the frame in the tilted resting position rests upon the support stand to prevent the frame from pivoting to a fully horizontal position.

3. An apparatus according to claim 2 further comprising a locking mechanism for releasably locking the frame to the support stand when the frame is in the tilted resting position.

4. An apparatus according to claim 3 wherein the upper forks are slidably coupled to the frame and the lower forks are slidably coupled to the frame.

5. An apparatus according to claim 4 further comprising means for causing the upper forks and the lower forks to slide in unison when the distance therebetween is greater than at least the height of one of the plurality of containers.

6. An apparatus according to claim 5 wherein the frame is pivotally attachable to a fixed point at a rear of the bed of the vehicle.

7. An apparatus according to claim 6 wherein the upper forks are rotatable about a common axis.

8. An apparatus according to claim 7 wherein the frame is telescopically extendible and retractable.

9. An apparatus for loading and transporting a plurality of containers on a vehicle, the apparatus comprising:
- a bed;
- a frame pivotally attached to the bed, the frame pivotable between a generally vertical loading position and a tilted resting position of between about 20 to 40 degrees over the bed;
- upper forks for loading a first container, the upper forks coupled to the frame and moveable between positions including a first height and a second height along the frame, the first height and the second height differing by greater than at least a height of one of the plurality of containers;
- lower forks for loading a second container, the lower forks coupled to the frame and configurable between a stowed configuration and a deployed configuration at the first height,
- wherein the upper forks are moveable to the first height for loading the first container when the lower forks are in the stowed configuration;
- wherein the lower forks are configurable to the deployed configuration at the first height for loading the second container when the upper forks loaded with the first container are at the second height;
- wherein the upper and lower forks load the first and second containers by slidingly engaging respective sleeves of the first and second containers;
- whereby the first container and second container may be sequentially loaded and simultaneously transported on the vehicle.

10. A vehicle for loading and transporting a plurality of containers, the vehicle comprising:
- a cab;
- a bed extending rearward from the cab;
- a frame pivotally attached to the bed, the frame pivotable between a generally vertical loading position and a tilted resting position of between about 20 to 40 degrees over the bed;
- upper forks for loading a first container, the upper forks coupled to the frame and moveable between positions including a first height and a second height along the frame, the first height and the second height differing by greater than at least a height of one of the plurality of containers;
- lower forks for loading a second container, the lower forks coupled to the frame and configurable between a stowed configuration and a deployed configuration at the first height,
- wherein the upper forks are moveable to the first height for loading the first container when the lower forks are in the stowed configuration;
- wherein the lower forks are configurable to the deployed configuration at the first height for loading the second container when the upper forks loaded with the first container are at the second height;
- wherein the upper and lower forks load the first and second containers by slidingly engaging respective sleeves of the first and second containers;
- whereby the first container and second container may be sequentially loaded and simultaneously transported on the vehicle.

11. An apparatus for loading and transporting a plurality of waste bins having side-mounted sleeves on a truck, the truck having a bed, the apparatus comprising:
- a forklift pivotally attachable to a rear of the bed of the truck, the forklift pivotable between a generally vertical loading position and a tilted resting position of between about 20 to 40 degrees over the bed;
- an upper set of forks for loading a first waste bin, the upper set of forks slidably coupled to the forklift and moveable between a first height and a second height along the forklift, the first height and the second height differing by at least a height of one of the plurality of waste bins;
- a lower set of forks for loading a second waste bin, the lower set of forks slidably coupled to the forklift;
- wherein the upper set of forks is moveable to the first height for loading the first waste bin when the lower set of forks is not at the first height;
- wherein the lower set of forks is moveable to the first height for loading the second waste bin when the upper set of forks loaded with the first waste bin is at the second height;
- wherein the upper and lower set of forks load the first and second waste bins by slidingly engaging respective sleeves of the first and second waste bins;
- whereby the first waste bin and second waste bin may be sequentially loaded and simultaneously transported on the truck.

12. An apparatus according to claim 11 further comprising a support stand attachable to the bed, whereby the forklift in the tilted resting position rests upon the support stand to prevent the forklift from pivoting to a fully horizontal position.

13. An apparatus according to claim 12 further comprising a locking mechanism for releasably locking the forklift to the support stand when the forklift is in the tilted resting position.

14. An apparatus according to claim 13 further comprising means for causing the upper set of forks and the lower set of forks to slide in unison when the distance therebetween is greater than at least the height of one of the plurality of waste bins.

15. An apparatus according to claim 14 wherein the upper set of forks is rotatable about a common axis.

16. An apparatus according to claim 15 wherein the forklift is telescopically extendible and retractable.

* * * * *